US006656889B2

(12) United States Patent
Eichenauer

(10) Patent No.: US 6,656,889 B2
(45) Date of Patent: Dec. 2, 2003

(54) THERMOPLASTIC MOLDING COMPOSITIONS CONTAINING ADDITIVE MIXTURES

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/955,785

(22) Filed: Sep. 18, 2001

(65) Prior Publication Data

US 2002/0082335 A1 Jun. 27, 2002

(30) Foreign Application Priority Data

Sep. 21, 2000 (DE) .......................................... 100 46 774

(51) Int. Cl.⁷ .............................. C08K 5/00; C08K 5/04; C08K 5/16; C08K 13/00; C08K 5/01
(52) U.S. Cl. ........................ 508/551; 508/567; 508/577; 524/210; 524/230; 524/504
(58) Field of Search ................................ 524/210, 230, 524/504; 508/551, 567, 577

(56) References Cited

U.S. PATENT DOCUMENTS

| | | |
|---|---|---|
| 3,745,145 A | 7/1973 | Khattab et al. |
| 4,248,778 A | 2/1981 | Arnold et al. |
| 4,957,968 A | 9/1990 | Adur et al. .................... 525/74 |
| 5,210,135 A | 5/1993 | Eichenauer et al. .......... 523/71 |
| 5,281,642 A | 1/1994 | Bourseau et al. ............ 524/230 |
| 5,658,985 A | 8/1997 | Eichenauer et al. .......... 525/83 |
| 6,114,291 A * | 9/2000 | He et al. ..................... 510/152 |
| 6,140,426 A | 10/2000 | Sarabi et al. ................ 525/316 |

FOREIGN PATENT DOCUMENTS

| | | |
|---|---|---|
| EP | 0 331 975 | 9/1989 |
| EP | 0923927 * | 6/1999 |
| GB | 1 546 651 | 3/1976 |
| JP | 53-77238 | 7/1978 |

OTHER PUBLICATIONS

Zhang et al., CAPLUS AN 1999:773302, abstracting CN 1148602.*

* cited by examiner

Primary Examiner—Jeffrey Mullis
(74) Attorney, Agent, or Firm—Joseph C. Gil; James R. Franks

(57) ABSTRACT

A thermoplastic molding composition comprising A) a thermopolastic polymer, e.g., a copolymer of styrene and acyrlonitrile, B) a graft copolymer, e.g., a graft copolymer of styrene, acrylonitrile and polybutadiene, and C) an additive mixture is described. The additive mixture C) comprises a combination of at least three components selected from components (I), (II), (III) and (IV). Component (I) contains carboxylic acid metal salt groups, e.g., magnesium stearate. Component (II) contains both carboxylic acid ester linkages and thio linkages, e.g., esters of β-thiodipropionic acid with monhydric alcohols. Component (III) contains amide linkages, e.g., ethylenediamine bisstearyl amide. Component (IV) is a compound that is different than components (I)–(III), e.g., a low molecular weight styrene/acrylonitrile copolymer. Also described are molded articles prepared from the thermoplastic molding composition of the present invention.

14 Claims, No Drawings

THERMOPLASTIC MOLDING COMPOSITIONS CONTAINING ADDITIVE MIXTURES

CROSS REFERENCE TO RELATED PATENT APPLICATION

The present patent application claims the right of priority under 35 U.S.C. 119 (a)–(d) of German Patent Application No. 100 46 774.1, filed Sep. 21, 2000.

FIELD OF THE INVENTION

The present invention relates to compositions containing matrix polymer, graft polymer and unique additive mixtures. The present invention also relates to the production of molded articles, and molded articles prepared from the compositions of the present invention. The additive mixture is also a subject of the present invention.

BACKGROUND OF THE INVENTION

Acrylonitrile-butadiene-styrene graft copolymer (ABS) molding compositions have already been used for many years in large quantities as thermoplastic resins for the production of all types of molded parts. The property spectrum of these resins typically ranges from relatively brittle to extremely tough.

A special area of use of ABS molding compositions is the production of molded parts by injection molding (e.g., housings, toys and vehicle parts), in which it is an important factor that the polymer material have good flowability. Also, the molded parts produced in this way typically must have a good notched-bar impact strength as well as a good resistance to thermal stresses.

The object therefore exists of achieving, for a given rubber content, a given rubber particle size and given matrix resin molecular weight, toughness values that are as high as possible while retaining the good thermoplastic flowability. In this connection the high toughness values should as far as possible be obtained independently of the type of matrix resin that is employed, and especially when using the styrene/acrylonitrile copolymers and α-methylstyrene/acrylonitrile copolymers typical of ABS.

One possible way of improving the toughness of ABS polymers with a given rubber content, given rubber particle size and given matrix molecular weight is to add special silicone oil compounds (see EP-A 6521). However, disadvantages associated with using silicone oil compounds include poor paintability, unsatisfactory printability or impaired yield stress values (danger of stress whitening). The addition of minor amounts of ethylene/propylene/non-conjugated diene (EPDM) rubber (see EP-A 412 370) or AES polymer (see EP-A 412 371) has also been described. Both methods require the use of considerable amounts of relatively expensive additive components however.

The use of large amounts of individual low molecular weight additive components, may in special cases improve the processability, although this is typically offset by a negative effect on other properties, such as toughness, modulus of elasticity and thermal stability.

SUMMARY OF THE INVENTION

In accordance with the present invention, there is provided a thermoplastic molding composition comprising:
A) 5 to 95 wt. % of a thermoplastic polymer selected from at least one of thermoplastic homopolymers, thermoplastic copolymers and thermoplastic terpolymers, said thermoplastic polymer being prepared from at least one monomer selected from styrene, α-methylstyrene, nuclear-substituted styrene, methyl methacrylate, acrylonitrile, methyacrylonitrile, maleic anhydride and N-substituted maleimide;
B) 5 to 95 wt. % of at least one graft polymer prepared from,
B.1) 5 to 90 parts by weight of at least one monomer selected from styrene, α-methylstyrene, nuclear-substituted styrene, methyl methacrylate, acrylonitrile, methyacrylonitrile, maleic anhydride and N-substituted maleimide, and
B.2) 10 to 95 parts by weight of at least one rubber having a glass transition temperature of $\leq 10°$ C.; and
C) 0.05 to 10 parts by weight, based on 100 parts of A+B, of a combination of at least three components selected from components (I), (II), (III) and (IV), wherein component (I) has at least one structural unit represented by the following formula:

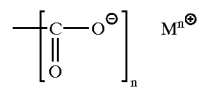

M being a metal, and
n being the valency of the metal M, component (II) has at least one structural unit represented by

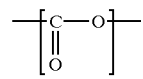

and at least one structural unit represented by

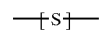

component (III) has at least one structural unit represented by the following formula,

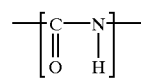

and
component (IV) is a compound different from those of components (I), (II) and (III), and is selected from at least one of: paraffin oils; hydrocarbon waxes; polystyrene produced by using $C_8$–$C_{18}$ alkyl mercaptans as molecular weight regulators, and having a mean weight averaged molecular weight between 2000 and 15,000; styrene/acrylonitrile copolymer produced by using $C_8$–$C_{18}$ alkyl mercaptans as molecular weight regulators, and having a mean weight averaged molecular weight of between 2000 and 15,000; α-methylstyrene/acrylonitrile copolymer produced by using $C_8$–$C_{18}$ alkyl mercaptans as molecular weight regulators, and having a mean weight averaged molecular weight of between 2000 and 15,000; and poly(methyl methacrylate) produced by using $C_8$–$C_{18}$ alkyl mercaptans as molecular weight regulators, and having a mean weight averaged molecular weight of between 2000 and 15,000; $C_6$–$C_{32}$ alkanols; and $C_6$–$C_{32}$ alkenols.

In accordance with the present invention, there is further provided an additive composition which comprises at least three components selected from compounds (I), (II), (III) and (IV).

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

Preferably each of the components (I) to (IV) contains at least one terminal aliphatic $C_6$–$C_{32}$ hydrocarbon radical.

According to the invention suitable examples of thermoplastic polymers A) include those prepared from monomers selected from styrene, α-methylstyrene, p-methylstyrene, vinyltoluene, halogenated styrene, methyl acrylate, methyl methacrylate, acrylonitrile, maleic anhydride, N-substituted maleimide and mixtures thereof.

The polymers A) are resin-like, thermoplastic and rubber-free. Particularly preferred thermoplastic polymers A) include those prepared from the polymerization of: styrene; methyl methacrylate; styrene/acrylonitrile mixtures; styrene/acrylonitrile/methyl methacrylate mixtures; styrene/methyl methacrylate mixtures; acrylonitrile/methyl methacrylate mixtures; α-methylstyrene/acrylonitrile mixtures; styrene/α-methylstyrene/acrylonitrile mixtures; α-methylstyrene/methyl methacrylate/acrylonitrile mixtures; styrene/α-methylstyrene/methyl methacrylate mixtures; styrene/α-methylstyrene/methyl methacrylate/acrylonitrile mixtures; styrene/maleic anhydride mixtures; methyl methacrylate/maleic anhydride mixtures; styrene/methyl methacrylate/maleic anhydride mixtures; and styrene/acrylonitrile/N-phenylmaleimide mixtures.

Polymers from which thermoplastic polymer A) may be selected are known and can be produced by free-radical polymerisation, in particular by emulsion, suspension, solution or bulk polymerisation. The polymers preferably have mean weight averaged molecular weights ($\overline{M}_w$) of 20,000 to 200,000 and intrinsic viscosities (η) of 20 to 110 ml/g (measured in dimethylformamide at 25° C.).

Suitable rubbers B.2) (also referred to herein as "graft bases") for the production of the graft polymers B) include, for example, polybutadiene, butadiene/styrene copolymers, butadiene/acrylonitrile copolymers, polyisoprene or alkyl acrylate rubbers based on $C_1$–$C_8$ alkyl acrylates, in particular ethyl acrylate, butyl acrylate and ethylhexyl acrylate.

The acrylate rubbers, from which rubber B.2) may be selected, may optionally contain up to 30 wt. % (referred to the rubber weight) of monomers such as vinyl acetate, acrylonitrile, styrene, methyl methacrylate and/or vinyl ether incorporated by copolymerisation. The acrylate rubbers may also contain small amounts, preferably up to 5 wt. % (referred to the weight of rubber) of crosslinking, ethylenically unsaturated monomers incorporated by polymerisation. Crosslinking agents include, for example, alkylene diol diacrylates and methacrylates, polyester diacrylates and methacrylates, divinyl benzene, trivinyl benzene, triallyl cyanurate, allyl acrylate and methacrylate, butadiene and isoprene. Graft bases may also include acrylate rubbers having a core/shell structure, with a core of crosslinked diene rubber of one or more conjugated dienes such as polybutadiene, or a copolymer of a conjugated diene with an ethylenically unsaturated monomer such as styrene and/or acrylonitrile.

Further suitable rubbers B.2) include, for example, the so-called EPDM rubbers (polymers of ethylene, propylene and a non-conjugated diene such as for example dicyclopentadiene), EPM rubbers (ethylene/propylene rubbers) and silicone rubbers that may optionally have a core/shell structure.

Preferred rubbers B.2) for the production of the graft polymers B) include diene rubbers and alkyl acrylate rubbers as well as EPDM rubbers.

The rubbers in the graft polymer B) are present in the form of at least partially crosslinked particles having a mean particle diameter ($d_{50}$) of 0.05 to 20 μm, preferably 0.1 to 2 μm and particularly preferably 0.1 to 0.8 μm. The mean particle diameter $d_{50}$ is determined by ultracentrifuge measurements according to W. Scholtan et al., Kolloid-Z. u.Z. Polymere 250 (1972), 782–796, or by evaluating electron microscope images.

The polymers B) may be produced by free-radical graft polymerisation of the monomers B.1) in the presence of the rubbers B.2), to which the monomers are grafted.

Preferred processes for producing the graft polymers B) include art-recognized methods, such as emulsion, solution, bulk or suspension polymerisation and combinations of these processes. Particularly preferred graft polymers B) are ABS polymers.

Most particularly preferred polymers B) are products that have been obtained by free-radical polymerisation of mixtures of styrene and acrylonitrile, preferably in a weight ratio of 10:1 to 1:1, particularly preferably in a weight ratio of 5:1 to 2:1, in the presence of at least one rubber built up predominantly from diene monomers (preferably polybutadiene that may contain up to 30 wt. % of styrene and/or acrylonitrile incorporated as comonomers) and having a mean particle diameter ($d_{50}$) of 100 to 450 nm. In a preferred embodiment of the present invention, monomers B.1) are polymerized in the presence of two rubbers built up predominantly from diene monomers (preferably polybutadiene that may contain up to 30 wt. % of styrene and/or acrylonitrile incorporated as comonomers). In a further embodiment of the present invention, a mixture of two rubbers a) and b) are used, and have: a) a mean particle diameter ($d_{50}$) of 150 to 300 nm; and b) a mean particle diameter ($d_{50}$) of 350 to 450 nm. The rubbers a) and b) are typically used in a weight ratio (a):(b)=10:90 to 90:10, and preferably 30:70 to 60:40.

The rubber content of the polymers B) is preferably 40 to 95 wt. %, particularly preferably 50 to 90 wt. %, and most particularly preferably 55 to 85 wt. %, based on the total weight of graft polymer B).

Examples of compounds from which components (I), (II), (III) and (IV) of additive mixture C) may each be selected are described as follows.

Compounds from which component (I) may be selected include, but are not limited to, magnesium stearate, calcium stearate, zinc stearate, magnesium montanate, calcium montanate, zinc montanate, magnesium behenate, calcium behenate, zinc behenate, magnesium oleate, calcium oleate, zinc oleate and mixtures thereof. Magnesium stearate and/or calcium stearate are preferred, with magnesium stearate being particularly preferred.

Component (II) may be selected from: esters of β-thiodipropionic acid, such as, lauryl, stearyl, myristyl or tridecyl esters of β-thiodipropionic acid; pentaerythritol-tetrakis-(β-dodecylmercapto)-propionate; and compounds represented by the following formula (V),:

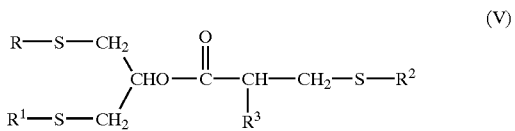

(V)

in which

R, R¹ and R² independently of one another denote $C_1$–$C_{20}$ alkyl, phenyl radicals that may be substituted by one or two $C_1$–$C_8$ alkyl groups, $C_7$–$C_{12}$ aralkyl radicals, or $C_5$–$C_{12}$ cycolalkyl radicals, R³ denotes H or $C_1$–$C_4$ alkyl.

Compounds represented by formula (V) can be produced in accordance with the procedure disclosed in EP-A 64 020.

Component (II) is preferably selected from esters of β-thiodipropionic acid. Particularly preferred esters of β-thiodipropionic acid include lauryl esters of β-thiodiopropionic acid, stearyl esters of β-thiodiopropionic acid and mixtures thereof.

Component (III) may be selected from at least one of ethylenediamine bisstearyl amide, erucic acid amide, oleic acid amide, stearic acid amide, behenic acid amide and montanic acid amide. Component (III) is preferably selected from ethylenediamine bisstearyl amide and/or erucic acid amide, of which ethylenediamine bisstearyl amide is particularly preferred.

Component (IV) may be selected from at least one of: paraffin oils; hydrocarbon waxes; low molecular weight polystyrene produced by using $C_8$–$C_{18}$ alkyl mercaptans as molecular weight regulators with mean weight averaged molecular weights ($\overline{M}_w$) between 2,000 and 15,000, preferably between 2,500 and 12,000 and particularly preferably between 3,000 and 10,000; low molecular weight styrene/acrylonitrile copolymer produced by using $C_8$–$C_{18}$ alkyl mercaptans as molecular weight regulators with $\overline{M}_w$ values between 2,000 and 15,000, preferably between 2,500 and 12,000 and particularly preferably between 3,000 and 10,000; low molecular weight α-methylstyrene/acrylonitrile copolymer produced by using $C_8$–$C_{18}$ alkyl mercaptans as molecular weight regulators with $\overline{M}_w$ values between 2,000 and 15,000, preferably between 2,500 and 12,000 and particularly preferably between 3,000 and 10,000; low molecular weight poly(methyl methacrylate) produced by using $C_8$–$C_{18}$ alkyl mercaptans as molecular weight regulators with $\overline{M}_w$ values between 2,000 and 15,000, preferably between 2,500 and 12,000 and particularly preferably between 3,000 and 10,000; $C_6$–$C_{32}$ alkanols, e.g. stearyl alcohol; and $C_6$–$C_{32}$ alkenols, e.g. oleyl alcohol.

Preferred materials from which component (IV) may be selected include: paraffin oils, low molecular weight styrene/acrylonitrile copolymers and α-methylstyrene/acrylonitrile copolymers (of which paraffin oils and/or low molecular weight styrene/acrylonitrile copolymers are particularly preferred).

Preferably all the components (I), (II), (III), and (IV) have a molecular weight above 300, preferably above 400 and particularly preferably above 500.

The quantitative ratios of at least three components selected from the components (I), (II), (III), and (IV) may be varied within wide ranges. The weight ratios are selected so that the following relationship is observed (as represented by the following formulas):

|  | (I) ≤ (IV) ≤ (II) ≤ (III) |
|---|---|
| particularly preferred | (I) ≤ (IV) ≤ (II) < (III) and |
| most particularly preferred | (I) < (IV) ≤ (II) < (III). |

Alternatively, the weight ratios of components (I), (II), (III), and (IV) may be selected so that the following relationship is observed (as represented by the following formulas):

|  | (I) ≤ (IV) ≤ (III) ≤ (II) |
|---|---|
| particularly preferred | (I) ≤ (IV) < (III) ≤ (II) and |
| most particularly preferred | (I) < (IV) < (III) ≤ (II) |

In a preferred embodiment of the present invention, the thermoplastic polymer A) is present in the molding composition in an amount of 35 to 85 wt. %. The thermoplastic polymer is preferably a copolymer prepared from: 5 to 40 parts by weight of acrylonitrile; and 95 to 60 parts by weight of styrene, α-methylstyrene, N-phenylmaleimide or mixtures thereof.

The thermoplastic compositions of the present invention, preferably contain graft polymer B) in an amount of 15 to 65 wt. %. Graft polymer B) is preferably prepared from: 25 to 60 parts by weight of styrene, α-methylstyrene, acrylonitrile, N-phenylmaleimide or mixtures thereof; and 75 to 40 parts by weight of polybutadiene.

Component mixture C) is preferably present in the thermoplastic molding composition of the present invention in an amount of 0.5 to 5 parts by weight per 100 parts by weight of A+B. Preferred components (I), (II), (III) and (IV) are described as follows.

| component (I) | magnesium stearate; |
|---|---|
| component (II) | β,β'-thiodipropionic acid dilauryl ester or β,β'-thiodipropionic acid distearyl ester; |
| component (III) | ethylenediamine bisstearyl amide; and |
| component (IV) | paraffin oil or low molecular weight styrene/acrylonitrile copolymer. |

The thermoplastic molding compositings of the present invention containing A), B), C) and optionally conventional additives such as processing aids, stabilisers, pigments, antistatics and fillers are prepared by mixing the respective constituents in an art-recognized manner simultaneously or successively at room temperature or at elevated temperature. The resultant mixtures are subsequently melt-compounded or melt-extruded at temperatures of 150° C. to 300° C. in conventional equipment such as internal mixers, extruders or double-shaft screw extruders.

The molding compositions of the present invention may be used to produce molded articles of all types. Art-recognized production procedures, such as injection molding, are typically used to prepare molded articles from the thermoplastic molding compositions of the present invention.

Sheets or films may be fabricated from the thermoplastic molding compositions of the present invention, and these sheets or films may be further processed by means of thermoforming techniques that are known to the skilled artisan.

The present invention further provides for the production of the compositions according to the invention, as well as molded articles produced therefrom. The invention also covers the additive combination C).

The present invention is more particularly described in the following examples, which are intended to be illustrative only, since numerous modifications and variations therein will be apparent to those skilled in the art. Unless otherwise specified, all parts and percentages are by weight.

EXAMPLES

Thermoplastic Resin A1

A statistical styrene/acrylonitrile (72:28) copolymer with a $\overline{M}_w$ of ca. 115,000 determined by GPC (gel permeation chromatography).

Thermoplastic Resin A2

A statistical α-methylstyrene/acrylonitrile (72:28) copolymer with a $\overline{M}_w$ of ca. 75,000 determined by GPC.

Graft Polymer B1

Graft product obtained by emulsion polymerisation of 42 wt. % of a styrene/acrylonitrile mixture (weight ratio 73:27) on 58 wt. % of a 1:1 mixture (weight ratio) of two particulate polybutadienes with a) a mean particle diameter ($d_{50}$) of 290 nm and b) a mean particle diameter ($d_{50}$) of 420 nm. The product is worked up by coagulating the latex with magnesium sulfate, washing with water, followed by drying in vacuo. particle diameter ($d_{50}$) of 290 nm and b) a mean particle diameter ($d_{50}$) of 420 nm. The product is worked up by coagulating the latex with magnesium sulfate, washing with water, followed by drying in vacuo.

Graft Polymer B2

Graft product obtained by emulsion polymerisation of 50 wt. % of a styrene/acrylonitrile mixture (weight ratio 73:27) on 50 wt. % of particulate polybutadiene with a mean particle diameter ($d_{50}$) of 130 nm. The product is worked up as under B1.

Additives C(I)–C(IV)

Additive CI1: magnesium stearate (Bärlocher, Munich, Germany)

Additive CI2: calcium stearate (Bärlocher, Munich, Germany)

Additive CII1: β,β'-thiodipropionic acid dilauryl ester (Irganox PS800®, Ciba Speciality, Basle, Switzerland Additive CII2: β,β'-thiodipropionic acid distearyl ester (Irganox PS802®, Ciba Speciality, Basle, Switzerland Additive CIII1: ethylenediamine bisstearyl amide (Henkel KG, Düsseldorf, Germany)

Additive CIV1: low molecular weight styrene/acrylonitrile copolymer ($\overline{M}_w$≈4,200, determined by GPC) produced by free-radical emulsion polymerisation of a mixture of 63.9 parts by weight of styrene, 23.6 parts by weight of acrylonitrile and 12.5 parts by weight of tert.-dodecyl mercaptan.

The individual components are compounded in the weight proportions specified in Table 1 in a 1.3 l capacity internal mixer at temperatures of 160° C. to 200° C. The molded articles are produced in an injection molding machine at 240° C.

The notched-bar impact strength is measured at room temperature ($a_k^{RT}$) and at −30° C. ($a_k^{-30° C.}$) according to ISO 180/1A (unit:kJ/m$^2$), and the thermoplastic flowability is evaluated by measuring the melt flow index (MVR) according to DIN 53 735 U (unit:cm$^3$/10 min). As can also be seen from Table 1, only by using the mixtures according to the invention can a very good combination of high toughness even at low temperatures and good processability be obtained.

TABLE 1

Compositions and Test Data of the Molding Compositions

| Example No. | A1 Parts by weight | A2 Parts by weight | B1 Parts by weight | B2 Parts by weight | CI1 Parts by weight | CI2 Parts by weight | CII1 Parts by weight | CII2 Parts by weight | CIII1 Parts by weight | CIV1 Parts by weight | $a_k^{RT}$ (kJ/m$^2$) | $a_k^{-30° C.}$ (kJ/m$^2$) | MVR (cm$^3$/10 min) |
|---|---|---|---|---|---|---|---|---|---|---|---|---|---|
| 1 | 70 | — | 30 | — | — | — | 2 | — | 1 | 0.5 | 19.2 | 17.0 | 11.2 |
| 2 | 70 | — | 30 | — | — | — | — | 2 | 1 | 0.5 | 19.2 | 16.8 | 11.0 |
| 3 | 70 | — | 30 | — | 0.5 | — | 2 | — | — | 0.5 | 18.8 | 16.7 | 10.7 |
| 4 | 70 | — | 30 | — | — | — | 1 | — | 2 | 0.5 | 18.8 | 16.8 | 11.4 |
| 5 (comp.) | 70 | — | 30 | — | — | — | 2 | — | — | 0.5 | 14.8 | 8.3 | 9.2 |
| 6 (comp.) | 70 | — | 30 | — | — | — | — | 2 | — | — | 14.9 | 8.5 | 8.5 |
| 7 | — | 75 | 12.5 | 12.5 | 0.5 | — | 2 | — | 1 | 0.5 | 16.8 | 8.8 | 7.0 |
| 8 | — | 75 | 12.5 | 12.5 | — | 0.5 | 2 | — | 1 | 0.5 | 16.9 | 8.4 | 6.2 |
| 9 | — | 75 | 12.5 | 12.5 | — | — | — | 2 | 1 | 0.5 | 17.9 | 10.2 | 5.3 |
| 10 | — | 75 | 12.5 | 12.5 | 0.5 | — | — | 2 | 1 | 0.5 | 18.0 | 9.4 | 5.7 |
| 11 (comp.) | — | 75 | 12.5 | 12.5 | — | — | 2 | — | — | 0.5 | 10.2 | 7.8 | 5.6 |
| 12 (comp.) | — | 75 | 12.5 | 12.5 | — | — | 2 | — | — | — | 10.6 | 8.5 | 5.0 |
| 13 (comp.) | — | 75 | 12.5 | 12.5 | — | — | — | — | — | — | 10.3 | 6.8 | 4.9 |
| 14 (comp.) | — | 75 | 12.5 | 12.5 | — | — | — | — | — | 0.5 | 6.7 | n.b. | 4.9 |
| 15 (comp.) | — | 75 | 12.5 | 12.5 | — | — | — | — | 1 | 0.5 | 12.1 | 6.7 | 5.8 |
| 16 (comp.) | — | 75 | 12.5 | 12.5 | 0.5 | — | — | — | — | 0.5 | 10.9 | 6.3 | 4.5 |
| 17 (comp.) | — | 75 | 12.5 | 12.5 | — | — | — | — | 1 | — | 11.9 | 7.1 | 5.3 |
| 18 (comp.) | — | 75 | 12.5 | 12.5 | 0.5 | — | — | — | — | — | 11.5 | 6.9 | 4.1 | n.b. = not measured

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising:
    A) 5 to 95 wt. % of a thermoplastic polymer selected from at least one of thermoplastic homopolymers, thermoplastic copolymers and thermoplastic terpolymers, said thermoplastic polymer being prepared from at least one monomer selected from styrene, α-methylstyrene, nuclear-substituted styrene, methyl methacrylate, acrylonitrile, methyacrylonitrile, maleic anhydride and N-substituted maleimide;
    B) 5 to 95 wt. % of at least one graft polymer prepared from,
        B.1) 5 to 90 parts by weight of at least one monomer selected from styrene, α-methylstyrene, nuclear-substituted styrene, methyl methacrylate, acrylonitrile, methyacrylonitrile, maleic anhydride and N-substituted maleimide, and B.2) 10 to 95 parts by weight of at least one rubber having a glass transition temperature of $\leq 10°$ C.; and C) 0.05 to 10 parts by weight, based on 100 parts of A+B, of component (III) and at least two further components selected from components (I), (II) and (IV), wherein component (I) has at least one structural unit represented by the following formula:

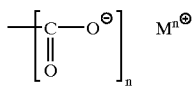

M being a metal, and
n being the valency of the metal M, component (II) has at least one structural unit represented by:

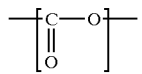

and at least one structural unit represented by:

component (III) has at least one structural unit represented by the following formula:

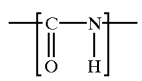

and
component (IV) is a compound different from those of components (I), (II) and (III), and is selected from at least one of: paraffin oils; hydrocarbon waxes; polystyrene produced by using $C_8$–$C_{18}$ alkyl mercaptans as molecular weight regulators, and having a mean weight averaged molecular weight between 2000 and 15,000; styrene/acrylonitrile copolymer produced by using $C_8$–$C_{18}$ alkyl mercaptans as molecular weight regulators, and having a mean weight averaged molecular weight of between 2000 and 15,000; α-methylstyrene/acrylonitrile copolymer produced by using $C_8$–$C_{18}$ alkyl mercaptans as molecular weight regulators, and having a mean weight averaged molecular weight of between 2000 and 15,000; and poly(methyl methacrylate) produced by using $C_8$–$C_{18}$ alkyl mercaptans as molecular weight regulators, and having a mean weight averaged molecular weight of between 2000 and 15,000; $C_6$–$C_{32}$ alkanols; and $C_6$–$C_{32}$ alkenols.

2. The thermoplastic molding composition of claim 1 wherein each of components (I), (II) and (III) has at least one terminal $C_6$–$C_{32}$ hydrocarbon radical.

3. The thermoplastic molding composition of claim 1 wherein component (I) is selected from at least one of magnesium stearate, calcium stearate, zinc stearate, magnesium montanate, calcium montanate, zinc montanate, magnesium behenate, calcium behenate, zinc behenate, magnesium oleate, calcium oleate and zinc oleate.

4. The thermoplastic molding composition of claim 1 wherein component (II) is selected from at least one of esters of β-thiodipropionic acid with monohydric alcohols and esters of β-thiodipropionic acid with polyhydric alcohols.

5. The thermoplastic molding composition of claim 1 wherein component (III) is selected from at least one of ethylenediamine bisstearyl amide, erucic acid amide, oleic acid amide, stearic acid amide, behenic acid amide and montanic acid amide.

6. The thermoplastic molding composition of claim 1 wherein component (I) is selected from at least one of magnesium stearate and calcium stearate; component (II) is selected from at least one of lauryl ester of β-thiodipropionic acid and stearyl ester of β-thiodipropionic acid; component (III) is selected from at least one of ethylenediamine bisstearyl amide and erucic acid amide; and component (IV) is selected from at least one of paraffin oils, styrene/acrylonitrile copolymers having a mean weight averaged molecular weight of between 2000 and 15,000 and α-methylstyrene/acrylonitrile copolymers having a mean weight averaged molecular weight of between 2000 and 15,000.

7. The thermoplastic molding composition of claim 1 wherein the relative amounts by weight of components (I), (II), (III) and (IV) are represented by one of the following formulas:

component (I)$\leq$component (IV)$\leq$component (II)$\leq$component (III) and component (I)$\leq$component (IV)$\leq$component (III)$\leq$component (II).

8. The thermoplastic molding composition of claim 1 wherein C) is present in an amount of 0.5 to 5 parts by weight per 100 parts by weight of:
A)+B).

9. The thermoplastic molding composition of claim 1 wherein B.2) is selected from at least one of diene rubbers, alkyl acrylate rubbers and ethylene/propylene/nonconjugated diene rubbers.

10. The thermoplastic molding composition of claim 1 further comprising at least one of processing aids, stabilizers, pigments, antistatics and fillers.

11. A method comprising producing, by means of injection-molding, a molded article comprising the thermoplastic molding composition of claim 1.

12. A molded article prepared from the thermoplastic molding composition of claim 1.

13. An additive composition comprising component (III) and at least two further components selected from components (I), (II) and (IV) wherein, component (I) is selected from at least one of magnesium stearate and calcium stearate;

component (II) is selected from at least one of lauryl ester of β-thiodipropionic acid and stearyl ester of β-thiodipropionic acid;

component (III) is selected from at least one of ethylenediamine bisstearyl amide and erucic acid amide; and component (IV) is selected from at least one of paraffin oils, styrene/acrylonitrile copolymers having a mean weight averaged molecular weight of between 2000 and 15,000, and α-methylstyrene/acrylonitrile copolymers having a mean weight averaged molecular weight of between 2000 and 15,000.

14. The additive composition of claim 13 wherein the relative amounts by weight of components (I), (II), (III) and (IV) are represented by one of the following formulas:

component (I)$\leq$component (IV)$\leq$component (II)$\leq$component (III) and component (I)$\leq$component (IV)$\leq$component (III)$\leq$component (II).

* * * * *